United States Patent [19]

Elter et al.

[11] Patent Number: 4,830,818

[45] Date of Patent: May 16, 1989

[54] CERAMIC INSTALLATIONS

[75] Inventors: Claus Elter, Bad Duerkheim; Edgar Hornischer, Mannheim; Hermann Schmitt, Winnweiler; Josef Schoening, Hambruecken; Ulrich Weicht, Weinheim, all of Fed. Rep. of Germany

[73] Assignee: Hochtemperatur Reaktorbau GmbH, Fed. Rep. of Germany

[21] Appl. No.: 5,585

[22] Filed: Jan. 21, 1987

[30] Foreign Application Priority Data

Jan. 22, 1986 [DE] Fed. Rep. of Germany ....... 3601748

[51] Int. Cl.$^4$ .................... G21C 7/22; G21C 11/06
[52] U.S. Cl. ................... 376/381; 376/203;
376/285; 376/338; 376/458; 376/904
[58] Field of Search ............. 376/203, 204, 205, 206, 376/285, 287, 338, 381, 383, 458, 459, 904

[56] References Cited

U.S. PATENT DOCUMENTS 4,314,883 2/1982 Fritz et al. .
4,642,214 2/1987 Zhong .
4,664,871 5/1987 Schoening .

FOREIGN PATENT DOCUMENTS 941781 11/1963 United Kingdom ................ 376/458
941782 11/1963 United Kingdom ................ 376/458

Primary Examiner—Deborah L. Kyle
Assistant Examiner—Richard W. Wendtland
Attorney, Agent, or Firm—Robert J. Koch

[57] ABSTRACT

A gas-cooled high temperature reactor having a core filled with spherical fuel elements is provided comprising a graphite side reflector including at least one nose-like projection comprised of a plurality of graphite nose stones stacked one upon the other, said nose stones each including at least one vertically disposed continuous cavity aligned with at least one vertically disposed continuous cavity in adjacent nose stones, said cavity adapted to receive discrete absorber material elements introduced into the reactor core, said nose stones further including at least one vertically aligned continuous gap which extends into said nose stones from a front portion thereof and is aligned with a corresponding continuous gap in adjacent nose stones, communication between said continuous gap and said cavity being prevented, said nose stones also comprising in top and bottom surfaces thereof sealing means which enable adjacent nose stones to be stacked in a manner sufficient to seal said at least one cavity in a gas-tight manner, thus preventing communication between said cavity and said core.

14 Claims, 2 Drawing Sheets

CERAMIC INSTALLATIONS

BACKGROUND OF THE PRESENT INVENTION

The invention concerns ceramic graphic reflector blocks for use in nuclear reactors.

Reflectors are used in nuclear reactors to reduce losses by the migration of neutrons. As indicated by the name, at least part of the neutrons moving to the outside are to be reflected back into the fission zone of the reactor (the so-called reactor core). Due to the increased reactor flux at the edge of the fission zone as the result of the reflector effect, the power produced by unit mass of the fissionable material is increased, thereby leading to an improved utilization and thus more economical consumption of the nuclear fuel. The term "side reflector" designates the laterally placed reflector as distinguished from the bottom or roof reflector.

In gas-cooled high temperature reactors high purity graphite is used as the material of the reflectors. It is relatively inexpensive, has adequate mechanical strength and may be mechanically worked. In addition, it has good fire resistance and thermal conductivity. A disadvantage is the change in its crystalline structure caused by neutron and gamma irradiation and expressed by altered strength properties and volume.

Under the effect of temperature and high neutron fluxes, graphite initially undergoes a negative expansion, which changes into positive expansion with increasing fluxes, beginning at a point of reversal. This process is displaced with rising temperature toward lower flux values.

The differences in expansion within a structural part—as a function of the flux distribution, at the onset of the radiation the layers of the block close to the surface of the side facing the core tend to shorten more extensively than the deeper layers—are the cause of the generation of residual stresses. To reduce these residual stresses, measures to relieve them and to compensate for expansions must be provided. This is attained advantageously by means of slit surface structures, which signifies a dimensional reduction in parts of the block.

Recent developments in gas-cooled high temperature nuclear reactors, in particular those of low capacity (approximately 100 MWel) and correspondingly small core diameters, used for the shutdown of the reactor in place of adsorber rods inserted directly into the pile of spherical fuel elements, small absorber elements of a spherical shape, which are introduced into apprpriate cavities of the reflector. As is already known from the AVR in Julich, so-called nose stones comprising continuous vertical cavities are placed in the core, intended to contain shutdown elements. The nose stones are brick-shaped graphite blocks, extending radially from the side reflector with which they are physically connected, and projecting over the entire height of the reactor core.

Because of the aforementioned volume changes and the residual stress states generated by them in the irradiated graphite blocks, their surfaces on the side of the core are provided with vertical and horizontal surface slits, representing the resolution of the large original surface into small individual sections. To control the stresses in the nose stones, the cavities provided to receive the absorber elements are connected by gap-like, continuous openings with the core. The stresses in the nose stones are reduced by these openings to acceptable values. However, the aforementioned expansions lead in the course of the operation to a widening of the openings to such an extent that the separation of the absorber material and the fuel elements is no longer assured and absorber elements may leave the cavities and fuel elements may enter between them. By the appropriate setting of the geometric parameters of the connecting gaps, the absorber elements may be safely separated from the fuel elements.

It is possible, however, that cooling gas will enter the cavities from the core through the gap establishing the connection between the cavities and the core, and through other gaps that form in the course of operations between the individual nose stones as the result of radiation induced material deformations, with said gas then interfering with or even preventing the charging of the cavities with the absorber elements by a strong flow of gas. Such interferences are the consequence of the fact that the dead weight of the absorber elements is being overcome by the flow of gas and the absorber elements are placed into a suspended state. Based on this state of the art, it is the object of the invention to provide measures for the structural design of ceramic installations, which may be carried out both simply and cost effectively and which avoid the aforementioned shortcomings even during extended operations. In particular, the planned charging with absorber elements is to be assured without interference by the entering cooling gas. The known measures to reduce residual stresses generated by neutron induced deformations are to remain in force.

SUMMARY OF THE PRESENT INVENTION

In keeping with such characteristics, the gap provided on the front side of the reflector to relieve the nose stone is present in the form of a deep slit or gap, which is not connected with the cavity in the nose stone.

Further, graphite sealing strips may be inserted between the individual layers of the nose stones to prevent the formation of leaks caused by neutron induced deformities. These sealing strips are intended to seal off the cavities against the core and offer additional assurance that no cooling gas will enter the cavities to interfere with the charging of the absorber elements.

The above-mentioned gaps, which in contrast to known solutions are not connected with the cavity in the nose stone, are formed in the nose stone laterally adjacent to the cavities outside the support surfaces, from the frontal side of the nose stone and open into bores positioned in a laterally offset manner with respect to the cavities. The depth required of the gap is a function of the radiation stresses generated and is determined accordingly.

In view of the mechanical stress resulting from the pile of fuel elements and acting on the nose stones, it is possible according to the invention to divide the cavities into individual chambers. For this purpose, each of the nose stones may be provided with a plurality of bores located radially behind each other, separated by graphite webs and not connected with each other. The cavities formed in this manner are aligned with similar cavities arranged in the nose stones located above and below the stone.

It may be appropriate in a layout of separate cavities to provide for the separate and independent charging of the cavities with absorber elements, thereby creating a redundancy of the shutdown systems.

The aforementioned graphite seals are, in the case of elongated cavities, in the form of trips, which for reasons of stress relief may be divided, and are guided in grooves machined into the lower support surfaces of the nose stones, while resting loosely on the lower nose stones.

In the case of cylindrical cavities, annular gaskets are set into the top and bottom sides of the nose stones placed upon each other. It may, however, be advantageous to provide a circumferential groove to receive graphite sealing strips in a manner similar to the configuration used with the elongated activities.

In a further embodiment of the invention the cavities drilled into the nose stones are equipped with sleeves into which the absorber elements are introduced. These sleeves may be placed upon or inserted into each other, with the joint between adjacent sleeves located in the center of the nose stones, so that the gap existing between the nose stones is covered. The aforementioned gaps, formed into the nose stones beginning at the frontal surface on the core side and serving to reduce residual stresses in the stones, are straight and are located outside the support surface parallel to the cavity.

According to a further embodiment, the gaps may be angled in order to relieve the wall structure bordering the cavities. In this manner, forces originating in the pile of fuel elements are kept away from the cavities.

A particular advantage of the configuration according to the invention with separate cavities in the nose stones in place of a single cavity consists of the fact that the cavities may be charged with the absorber material independently of each other. Aside from the fact that the absorber effect may also be varied in this manner, this configuration provides an important safety engineering redundancy of the shutdown system of the reactor.

DETAILED DESCRIPTION OF THE PRESENT INVENTION

The present invention is further described below with reference to the drawings wherein certain embodiments of the invention are described, together with advantageous configurations and advantages.

Figure 1:
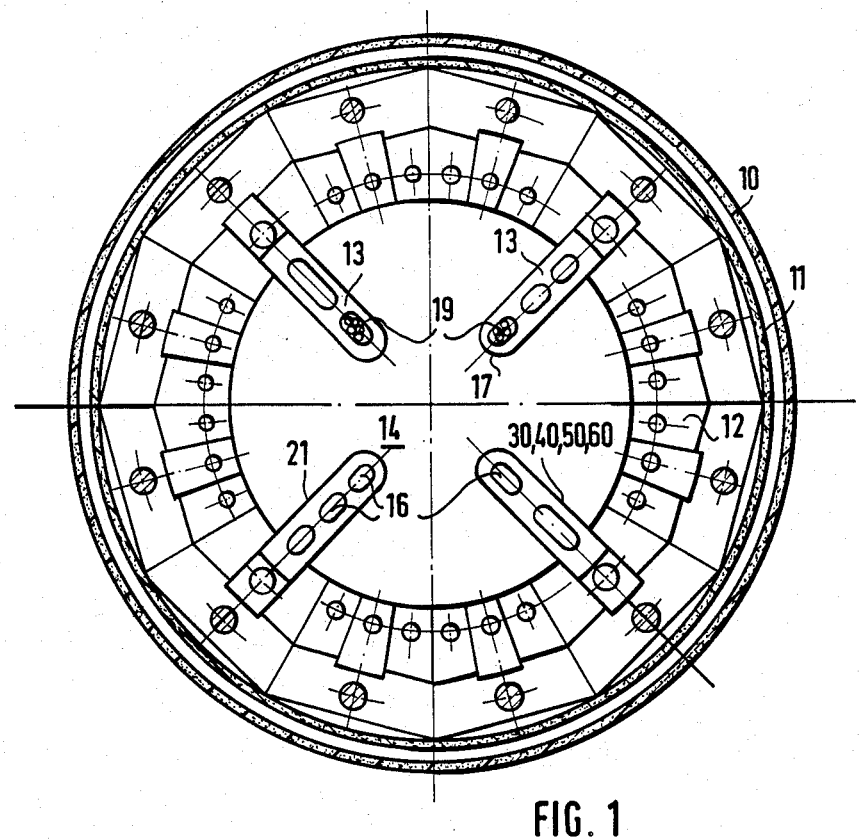
FIG. 1 shows a core with ceramic installations of different configurations.

FIG. 1 shows a cross-section through a core 14, bordered by a circular cylindrical reactor pressure vessel 10 and a thermal side shield 11, connected with ceramic installations serving as the side reflector 12, and into which four projections 13 are protruding radially, in opposing pairs.

The projections 13 consists of individual nose stones 30, 40, 50, 60 placed upon each other and positively bonded to the side reflector 12. The projections 13, which are made of graphite in the same manner as the side reflector, comprise a plurality of vertically located cavities 16, having an oval or elongated cross-section extending parallel to the outer srrface 21 facing the core 14. While the core is intended to receive the fuel elements (not shown), the vertical cavities 16 serve to contain and receive the absorber elements 19.

Figure 2:
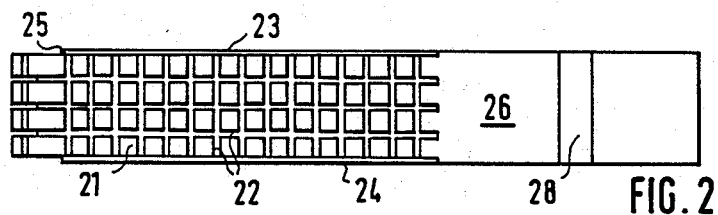
FIG. 2 shows a lateral elevation of a nose stone.

FIG. 2 shows a single nose stone 30, 40, 50, 60 in a lateral elevation. The surface 21 protruding into the core 14 of the nose stone 30, 40, 50, 60 is provided with slit-like vertical and horizontal recesses 22 close to the surface, in order to divide the outer surface of the nose stone 30, 40, 50, 60 exposed to the neutron radiation into small segments, thereby creating an adequate possibility of equalizing the neutron induced volume changes.

From the lateral and frontal walls 21 of the nose stone 30, 40, 50, 60 equipped with the slits 22, the upper and lower support surfaces 23, 24 are stepped down by means of the steps 25, whereby the nose stone 30, 40, 50 60 joins upward and downward the next nose stone 30, 40, 50, 60 or the bottom or roof reflector.

The height of the step 25 corresponds to one-half the width of a surface slit 22, so that a slit 22 is created in the area of the adjacent support surfaces 24 when the nose stones 30, 40, 50, 60 are set upon each other.

In the rear part of the nose stone 30, 40, 50, 60 bonded into the side reflector 12, a groove 28 is provided in its lateral surface 26 to anchor it positively into the side reflector 12. The otherwise smooth, unslit surface 26 follows the slit surface 21 in alignment.

FIGS. 3 to 6 show the top surface of symmetrically designed nose stones 30, 40, 50, 60 wherein it is sufficient for the purpose of information to display a sectional view along the symmetry axis each. The other half, which is not shown, comprises an identical mirror image.

Figure 3:
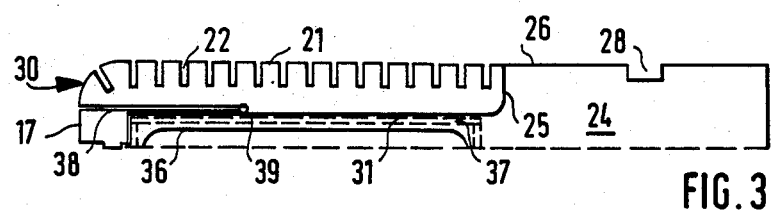
FIG. 3 shows a top view of a nose stone with an undivided cavity and a straight line relief gap.

FIG. 3 shows a top view of a nose stone 30 comprising a cavity 36 with an elongated cross-section and enclosed by walls 21 provided with slits 22 on the lateral and frontal sides, located along the longitudinal axis of the nose stone 30. The surface 26 in the rear area of the nose stone 30 joins the lateral walls 21 in alignment and comprises on either side a vertical groove 28, serving to positively anchor the nose stone 30 in the side reflector 12.

The slit walls 21 are separated by a step 25 from the bottom support surface 24 whereby the nose stone 30 joins the nose stone 30 beneath it. A groove 37 cut into the bottom support surface 24 between the step 25 and the cavity 36 and completely surrounding the cavity 36, is intended to receive the graphite seals. These graphite seals, set into the straight zone in the form of sealing strips, seal the cavities 36 during the operation of the reactor in a gas-tight manner against the core 14.

In the frontal side 17, a straight, deep gap 3 is forme into one-half of the surface, said gap terminating in a vertical bore 39. The gap is intended to relieve stresses in the nose stone 30 and extends in the area of the lateral slit wall 21 parallel to the step 25.

The bore 39 serves to reduce notch stresses at the opening of the gap, and which is usually produced by sawing.

Figure 4:
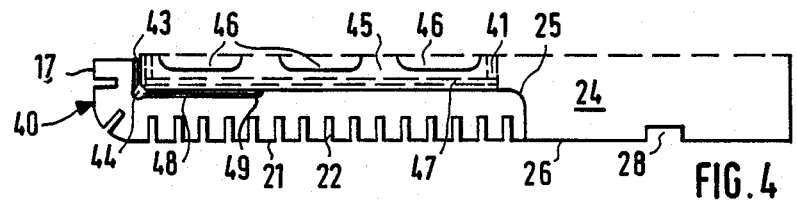
FIG. 4 shows a top view of a nose stone with divided cavities and an angled relief gap.

FIG. 4 shows a top view of a nose stone 40, which is similar in shape to the nose stone 30 in FIG. 3. In contrast to the latter, however, in the nose stone 40 in place of a common cavity, a plurality of cavities 46 separated from each other by transverse webs 45 are provided, said cavities being surrounded, as before, by a common groove 47 cut into the lower support surface 24.

Here again, the bottom support surface 24 is raised by means of a step 25 from the lateral and frontal wall equipped with slits.

In contrast to the layout shown in FIG. 3, the gap 48 for the reduction of neutron induced residual stresses in the nose stone 40 is not provided in pairs, but centrally extends from the frontal side 17 into the nose stone 40 to a first bore 43, where the gap 48 forms a fork and continues transversely to the center axis with both branches, to a second bore 44. From here, the gap 48 continues parallel to the step 25 to a third bore 49. The bores 43, 44, 49, all of which are vertical, are intended to eliminate the notch effects resulting from the variable configuration of the gap 48 and its cross-section which, due to the saw cut, has sharp edges. Grooves 28 are cut into the rear side walls 26 of the nose stone 40, serving to anchor the nose stone 40 in the side reflector 12.

Figure 5:
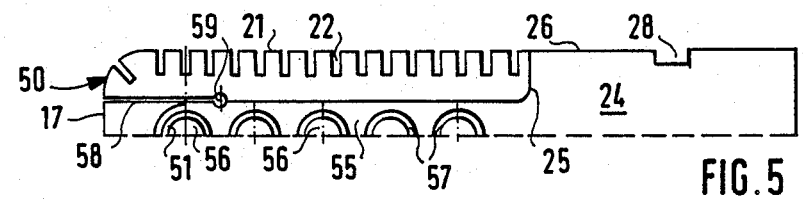
FIG. 5 shows a top view of a nose stone with cylindrical cavities and a straight line relief gap.

FIG. 5 shows in a top view a layout similar to the preceding figures. A nose stone 50 comprises a plurality of cylindrical cavities 56 arranged in succession on the center axis, intended to receive the absorber material and separated from each other by the transverse webs 55.

In place of a common groove surrounding the cavities 56 for the graphite seals, each cavity 56 is framed by an annular groove 57, into which a graphite gasket 51 is set.

In agreement with the configurations shown above, the bottom support surface 24 is raised by means of a step 25 in relation to the lateral and frontal wall 21 equipped with slits. The rear side wall 26 which follows in alignment, is provided on either side with a vertical groove 28 to anchor the stone in the side reflector 12.

A gap 58 cut into the nose stone 50 from the frontal side 17 symmetrically in a straight line and ending in a vertical bore 59 serves to reduce residual stresses in the nose stone 50.

Figure 6:
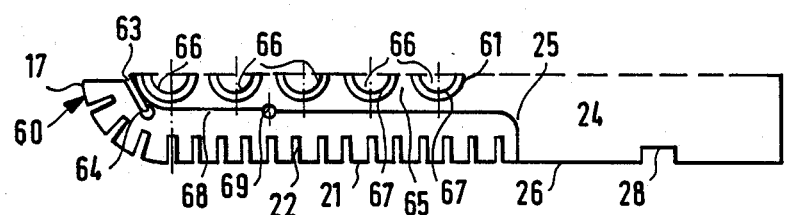
FIG. 6 shows a top view of a nose stone with cylindrical cavities and an angled relief gap.

FIG. 6 shows a nose stone 60 similar to the stone of FIG. 5, with a plurality of cylindrical bores 61 arranged in succession on the center axis, into which cylindrical graphite sleeves 67 are set, which on the one hand define cavities 66 to receive the absorber material, and on the other hand seal the gas permeable gaps between the nose stones 60 set upon each other. For the purpose, the cylindrical sleeve 67 extends halfway into the corresponding bore 61, while the other half is protruding. Depending on their configuration, the cylindrical sleeves 67 are set upon each other with blunt ends, or else the ends are conical, so that the sleeves 67 may be inserted into each other, for example, in the manner of a stove pipe.

Similarly to FIG. 4, a gap 68 extends centrally from the frontal side 17 into the nose stone 60. The gap 68 branches off symmetrically at a bore 63 and continues to a lateral bore 64, from which it extends parallel to the step 25 to a bore 69. The step 25 separates the lower support surface 24 from the slit side wall 21, which joins the rear wall 26 in alignment, said rear wall 26 comprising a groove 28 for the anchoring of the nose stone 60 in the side reflector 12.

The examples shown and described do not exclude different combinations of gap and cavity configurations, thus for example, the cavity arrangement of FIG. 4 may very well be combined with the gap geometry according to FIG. 3, without incurring any disadvantages.

What is claimed is:

1. In combination with a gas-cooled, high temperature reactor having a core filled with spherical fuel elements, a graphite side reflector including at least one nose-shaped projection comprised of a plurality of graphite nose stones stacked one upon the other, said nose stones each including at least one verticallly-disposed, continuous cavity aligned with at least one vertically-disposed, continuous cavity in adjacent nose stones, said cavity being adapted to receive discrete absorber material elements introduced into said cavity, said nose stones further including at least one verticallly-aligned, continuous gap which extends into said nose stones from a front portion thereof and is aligned with a corresponding continuous gap in adjacent nose stones, communication between said continuous gap and said cavity being prevented, said nose stones also comprising in top and bottom surfaces thereof sealing means which enable adjacent nose stones to be stacked in a manner sufficient to seal said at least one cavity in a gas-tight manner, thus preventing communication between absorber material elements in said cavity and said core.

2. The combination according to claim 1, wherein said sealing means comprises grooves in said top and bottom surfaces of the nose stones which cooperatively engage an inserted graphite gasket upon the stacking of the nose stones upon each other.

3. The combination according to claim 1, wherein said continuous gap extends into the front portion of said nose stones from a central point from which point said gap extends toward and along a portion of at least one side wall of said nose stone.

4. The combination according to claim 1, wherein said nose stones comprise a single cavity having an elongated cross-section aligned along the central axis of said nose stone.

5. The combination according to claim 4, wherein said nose stones comprise plurality of cavities aligned along the central axis of said nose stone.

6. The combination according to claim 5, wherein said cavities have an elongated cross-section.

7. The combination according to claim 5, wherein said cavities have a circular cross-section.

8. The combination according to claim 1, further including a graphite sleeve within said at least one cavity adapted to receive said absorber material elements and seal said cavity.

9. The combination according to claim 8, wherein said graphite sleeve has a longitudinal dimension corresponding to the height of the nose stone.

10. The combination according to claim 9, wherein said graphite sleeve is inserted in a manner such that said sleeve extends one-half the distance into each adjacent nose stone.

11. The combination according to claim 10, wherein the ends of said graphite sleeve are adapted to cooperatively engage in sealing relationship the ends of adjacent graphite sleeves.

12. The combination according to claim 1, comprising at least two nose-like projections uniformly positioned around the circumference of the reactor.

13. The combination according to claim 12, comprising four nose-like projections uniformly positioned around the circumference of the reactor in the form of opposing pairs aligned along a common axis.

14. The combination according to claim 1, wherein said at least one nose-like projection includes a plurality of slit-like grooves in the exterior surface thereof.

* * * * *